United States Patent
Chamberot et al.

(10) Patent No.: US 10,943,230 B2
(45) Date of Patent: Mar. 9, 2021

(54) METHOD FOR MONITORING USAGE PATTERNS AND ELECTRONIC DEVICE CAPABLE OF IMPLEMENTING SUCH A METHOD

(71) Applicant: IDEMIA France, Colombes (FR)

(72) Inventors: Francis Chamberot, Colombes (FR); Marco De Oliveira, Colombes (FR)

(73) Assignee: IDEMIA France, Colombes (FR)

( * ) Notice: Subject to any disclaimer, the term of this patent is extended or adjusted under 35 U.S.C. 154(b) by 327 days.

(21) Appl. No.: 15/858,906

(22) Filed: Dec. 29, 2017

(65) Prior Publication Data
US 2018/0189782 A1     Jul. 5, 2018

(30) Foreign Application Priority Data
Dec. 30, 2016 (FR) ...................................... 1663558

(51) Int. Cl.
     *G06Q 40/00*      (2012.01)
     *G06Q 20/38*      (2012.01)
     (Continued)

(52) U.S. Cl.
     CPC ....... *G06Q 20/389* (2013.01); *G06F 11/3041* (2013.01); *G06F 21/34* (2013.01);
     (Continued)

(58) Field of Classification Search
     CPC .. G06Q 20/389; G06Q 20/341; G06Q 20/343; G06Q 20/3576; G06Q 20/4016; G06F 11/3041; G06F 21/34
See application file for complete search history.

(56) References Cited

U.S. PATENT DOCUMENTS 10,091,180 B1 * 10/2018 Moritz ................. H04L 63/102
10,366,378 B1 * 7/2019 Han ..................... G06Q 20/4014
(Continued)

FOREIGN PATENT DOCUMENTS

| CN | 1333904 | * | 1/2002 | ....... G06Q 20/40975 |
| JP | 2018-538625 | * | 12/2018 | ......... G06Q 20/4016 |

(Continued)

OTHER PUBLICATIONS

Kuganathan, et al. "Next Generation Smart Transaction Touch Point," International Conference on Advances in ICT for Emerging Regions, ICTer (Year: 2014).*
(Continued)

*Primary Examiner* — Alexander G Kalinowski
*Assistant Examiner* — William B Bunker
(74) *Attorney, Agent, or Firm* — Christensen O'Connor Johnson Kindness PLLC

(57) ABSTRACT

The invention relates to a method for controlling a transaction carried out between an electronic device comprising a secure memory and an external terminal by monitoring usage patterns of the electronic device, wherein a first and a second item of usage information are read when the transaction is carried out; a first list of data pairs is recorded on the secure memory, each of said pairs comprising the first and second (IU2) items of usage information; a second list of counters is recorded on the secure memory; an indicator for monitoring usage patterns of the electronic device is calculated on the basis of the first item of usage information, the second item of usage information, and/or a counter from the second list.

9 Claims, 5 Drawing Sheets

(51) Int. Cl.
*G06Q 20/40* (2012.01)
*G06Q 20/34* (2012.01)
*G06F 11/30* (2006.01)
*G06F 21/34* (2013.01)

(52) U.S. Cl.
CPC ......... *G06Q 20/341* (2013.01); *G06Q 20/343* (2013.01); *G06Q 20/3576* (2013.01); *G06Q 20/4016* (2013.01)

(56) References Cited

U.S. PATENT DOCUMENTS

| | | | | |
|---|---|---|---|---|
| 2005/0033688 | A1* | 2/2005 | Peart | G06Q 20/04 705/39 |
| 2010/0252624 | A1* | 10/2010 | Van de Velde | G06Q 20/045 235/382 |
| 2011/0166997 | A1* | 7/2011 | Dixon | G06Q 20/20 705/41 |
| 2011/0251958 | A1* | 10/2011 | Aubin | G06Q 20/3576 705/44 |
| 2012/0102274 | A1* | 4/2012 | Nonogaki | G06F 15/167 711/152 |
| 2012/0148041 | A1* | 6/2012 | Buhr | H04L 9/0869 380/46 |
| 2013/0061290 | A1* | 3/2013 | Mendel | G06Q 20/405 726/4 |
| 2016/0110718 | A1* | 4/2016 | Jajara | G06Q 20/322 705/44 |
| 2016/0275516 | A1* | 9/2016 | Bender | H04L 63/08 |
| 2018/0157858 | A1* | 6/2018 | Attfield | G06F 21/6218 |

FOREIGN PATENT DOCUMENTS

| | | | | |
|---|---|---|---|---|
| WO | WO-0133317 | A1 * | 5/2001 | G06F 21/64 |
| WO | WO-2016097650 | A1 * | 6/2016 | G06Q 20/341 |

OTHER PUBLICATIONS

Riviere et al., "A Novel Simulation Approach for Fault Injection Resistance Evaluation on Smart Cards," IEEE Eighth Conference on Software Testing, Verification and Validation Workshops (Year: 2015).*

Rapport de Recherche Preliminaire, dated Sep. 19, 2017, issued in corresponding French Application No. 1663558, filed Dec. 30, 2016, 2 pages.

Opinion Écrite sur la Bervetabilitéde l'Invention, issued in corresponding French Application No. 1663558, filed Dec. 30, 2016, 6 pages.

* cited by examiner

METHOD FOR MONITORING USAGE PATTERNS AND ELECTRONIC DEVICE CAPABLE OF IMPLEMENTING SUCH A METHOD

BACKGROUND OF THE INVENTION

The present invention relates to the general field of electronic devices capable of cooperating with an external terminal in order to carry out an operation, such as a transaction, for example.

The invention relates in particular to a method for monitoring usage patterns of an electronic device, and to an electronic device capable of implementing said method. The invention applies more particularly, but not exclusively, to smart cards (or microcircuit cards) that comply with the ISO7816 standard, for example. The invention is, in particular but not exclusively, directed to the use of a smart card that operates according to the EMV (Europay Mastercard Visa) protocol.

In general, a smart card is designed to communicate with a device that is external to said card, otherwise known as a terminal or external terminal. Said cards allow various types of transaction to be carried out, such as payment transactions or card holder authentication transactions, for example. Smart cards for banking applications (credit card, debit card, etc.), for example, are capable of communicating with payment terminals. EMV is the most widely used standardised protocol in the world for securing, in particular, payment transactions carried out by smart cards.

The EMV protocol was designed to reduce the risk of fraud during a payment transaction. Numerous security mechanisms have recently been developed for securing, as far as possible, the increasing use of smart cards, in particular of the EMV type.

An EMV card may operate online or offline, depending on the type of card used, the situation or the proposed amount. In online mode, the EMV card can communicate, via the external terminal, with the corresponding issuing entity (the bank of origin of the card, for example) in order to verify that the transaction in progress is legitimate. On the other hand, if the EMV card operates in off line mode, it applies pre-recorded verification criteria in order to decide whether the transaction should be authorised or refused.

Therefore, EMV smart cards have been developed which are capable of detecting a fraudulent transaction on the basis of an analysis of information corresponding to said transaction. Said information, which is recorded by the EMV card at the time of the transaction, for example relates to the recipient of the transaction, the date and time of the transaction, or the amount of the transaction if it is a financial transaction.

When the EMV used operates in online mode, said information is encrypted and fed back to bank servers that are configured to analyse said information using analysis software installed on said servers. Said software can access a large number of transactions carried out and can monitor the usage patterns of an EMV card in real time, i.e. at the time said card is being used.

However, when the EMV card is used in off line mode, said information cannot be analysed in real time. Until said information is fed back to a bank server configured to analyse same, a certain amount of time may elapse between the card carrying out a transaction and the analysis of said usage information. This disadvantage poses a significant security problem, since a fraudulent transaction cannot be detected during this time period, for example if the EMV card is being used by a user who is not the owner.

At present, the options for tracking the behavioural patterns of a holder of a smart card (or the like) or the operations carried out by said card are limited and call for new mechanisms. It is in particular necessary to analyse the usage information of a payment card in off line mode using a solution that prevents current protocols implemented by electronic devices and the corresponding external terminals from being drastically modified.

However, at present, there is no satisfactory mechanism that makes it possible to initiate or carry out analyses of information relating to a transaction directly on an EMV payment card that is carrying out a transaction in conjunction with an external terminal, in order to identify possible fraudulent transactions carried out using said card.

AIM AND SUMMARY OF THE INVENTION

In order to overcome this problem, an aim of the present invention is to propose a method that is suitable for monitoring usage patterns of an electronic device, used in order to carry out a transaction, solely from said electronic device.

Correspondingly, an aim of the present invention is to propose an electronic device that is configured to implement said method and is capable of detecting a fraudulent transaction carried out in online mode and in offline mode.

A first aspect of the invention thus relates to a method for monitoring usage patterns of an electronic device comprising a secure memory, said method comprising:
  a) a step of reading a first and a second item of usage information when a transaction is being carried out between said electronic device and an external terminal;
  b) a first step of recording, on said secure memory of the electronic device, a first list of data pairs, each of said pairs comprising said first and said second item of usage information;
  c) a second step of recording, on the secure memory of the electronic device, a second list of counters;
  d) a step of calculating at least one indicator for monitoring usage patterns of the electronic device at least on the basis of the first item of usage information, the second item of usage information, and/or a counter from said second list.

Advantageously, said method makes it possible to detect a fraudulent transaction carried out offline, without having to send information to a bank server.

Advantageously, said method also makes it possible to record a limited amount of electronic device usage information on a memory of said electronic device.

Advantageously, said method also makes it possible to implement a mechanism for recognising patterns of an electronic device, the memory of which is limited.

In a particular embodiment of the invention, the first item of usage information is an item of data for identifying the external terminal.

In a particular embodiment of the invention, the first recording step records only the second item of usage information in the first list of data pairs if the first item of usage information is comprised in one of said pairs prior to the reading step.

In a particular embodiment of the invention, the calculation step is implemented when the number of pairs recorded in the first list and comprising an identical value of the first item of usage information is greater than a predetermined number selected from: 3, 4, 5, 6.

In a particular embodiment of the invention, the second item of usage information is sequential information.

In a particular embodiment of the invention, the second item of usage information is an item of time information comprised in a predetermined time range.

In a particular embodiment of the invention, said counters are selected from: a transaction counter and a transaction accumulator for a predetermined time range of the electronic device.

In a particular embodiment of the invention, the predetermined time range is an hour range of a day of the week.

In a particular embodiment of the invention, the calculation step calculates a value of said monitoring indicator, said value being selected from:
- a first item of usage information from at least one pair recorded in the first list;
- a second item of usage information from at least one pair recorded in the first list;
- a current value of at least one of said counters recorded in the second list;
- a difference between a current value of at least one of said counters from the second list and a current value of an application transaction counter of said electronic device;
- an estimation of at least one ratio of a current value of an application transaction counter of said electronic device to a current value of at least one of said counters from the second list.

In a particular embodiment of the invention, the method additionally comprises, subsequently to the calculation step:
- e) a step of sending the calculated monitoring indicator to a bank sever in a monitoring message;
- f) a step of cancelling the transaction by means of a cancellation message issued by the bank server when the value of the indicator is greater than a predetermined threshold.

In a particular embodiment of the invention, the transaction conforms with the EMV protocol.

Another aspect of the invention additionally relates to a computer program comprising instructions for executing the steps of a method according to any of the particular embodiments of the invention when said program is executed by the electronic device.

Another aspect of the invention additionally relates to a recording medium that can be read by a microprocessor on which a computer program is recorded which comprises instructions for executing the steps of a method according to any of the particular embodiments of the invention.

Another aspect of the invention additionally relates to an electronic device comprising:
- a reader module which is programmed to read a first and a second item of usage information when a transaction is being carried out between said electronic device and an external terminal;
- a secure memory comprising:
  - a first recording module for recording a first list of data pairs, each of said pairs comprising said first and said second item of usage information;
  - a second recording module for recording a second list of counters;
- a calculation module which is programmed to calculate at least one indicator for monitoring usage patterns of the electronic device at least on the basis of the first item of usage information, the second item of usage information, and/or a counter from said second list.

In a particular embodiment of the invention, the electronic device is a smart card.

In the present description and in the accompanying claims, it shall be understood that the expression "greater than" is used to designate a quantity of which the value is greater than or equal to another, whereas the expression "less than" is used to designate a quantity of which the value is less than or equal to another.

It shall be understood that calculating a difference between a first quantity and a second quantity consists in subtracting said first quantity from said second quantity. It shall also be understood that calculating a ratio of a first quantity to a second quantity consists in dividing said first quantity by said second quantity.

Moreover, it shall be understood that the computer programs mentioned in the present disclosure may use any programming language and be in the form of a source code, object code, or an intermediate code between a source code and object code, such as in a partially compiled form, or in any other desired form.

Furthermore, the recording (or information) media mentioned in the present disclosure may be any entity or device capable of storing the program. For example, the medium may comprise a storage means, such as a ROM, for example a CD ROM or a ROM having a microelectronic circuit, or a magnetic recording means, for example a floppy disc or a hard disc.

However, the recording media may take the form of a transmittable medium such as an electrical or optical signal that can be conveyed via an electrical or optical cable, by radio or by other means. The program according to the invention may be in particular downloaded from a network such as the Internet.

Alternatively, the recording media may take the form of an integrated circuit in which the program is incorporated, the circuit being adapted to execute or to be used for executing the method in question.

BRIEF DESCRIPTION OF THE DRAWINGS

Other features and advantages of the present invention will become clear from the description below, with reference to the accompanying drawings which illustrate non-limiting embodiments of the present invention. In the drawings.

Figure 1:
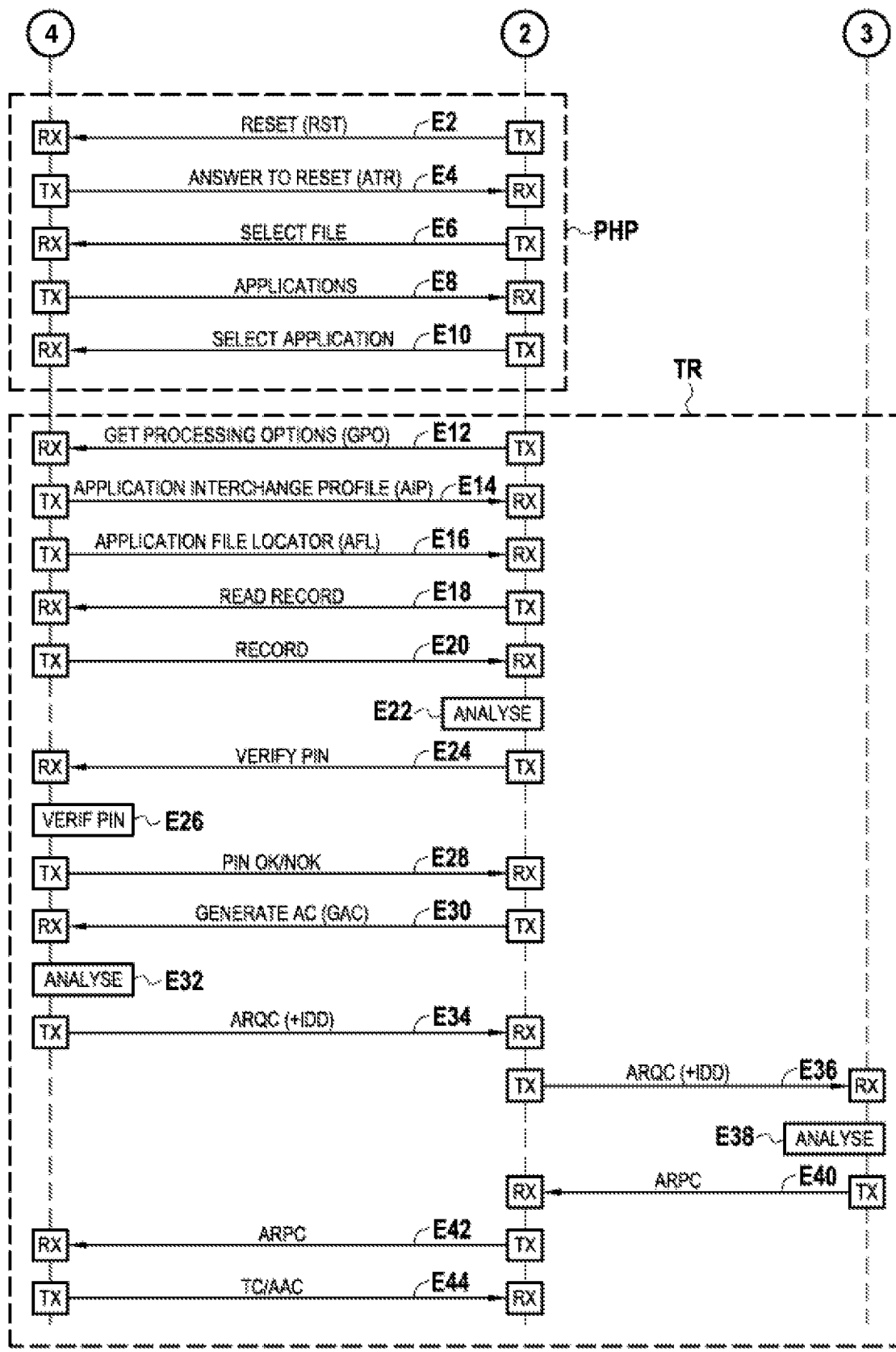
FIG. 1 is a flowchart of an example of cooperation between a smart card and an external terminal in conformity with the EMV protocol.

Of course, in order to meet specific requirements, a person skilled in the art could modify certain aspects of the following description. Although it relates to different embodiments, the present invention is not limited to said specific embodiments, and all modifications within the scope of the present invention can be considered to be obvious to a person skilled in the relevant art.

DETAILED DESCRIPTION OF AN EMBODIMENT

As indicated above, the present invention relates to the general field of electronic devices capable of cooperating with an external terminal (or reader) in order to carry out an operation, such as a transaction, for example.

The invention in particular relates to the analysis of information regarding a transaction carried out by electronic devices of this kind, in order to identify possible fraudulent uses carried out by said electronic device, or in order to carry out processing depending on particular behaviours observed in the electronic device.

The invention is based on the principle of storing usage information relating to the electronic device on said electronic device in order to analyse said information and to calculate one or more indicators that are representative of the usage patterns of a user.

Said usage patterns comprise, for example, the recipients, the date, the amounts or the number of transactions carried out by the electronic device, in particular in offline mode.

Monitoring said usage patterns makes it possible to calculate a monitoring indicator, the comparison of which to predetermined values makes it possible to detect whether a transaction carried out departs from the usage patterns of the electronic device, for example in the case of fraud, theft or piracy.

The present invention is described in the following disclosure within the context of a smart card (which conforms, for example, with the ISO7816 standard) of the EMV type, said card being capable of feeding information back to an external terminal during an EMV transaction. However, it shall be understood that other types of protocol may be included within the scope of the invention.

The invention is more generally directed to an electronic device that is intended to cooperate with an external terminal in order to carry out an operation, typically a transaction (payment transaction, for example). Said electronic device is in particular a smart card that is capable of providing an item of security information to the external terminal after having initiated a transaction therewith.

The notion of "transaction" is in this case understood in the broader sense and includes, for example, in the banking sector, a payment or transfer transaction. The invention is described here within the context of a payment card intended to carry out banking transactions. It shall be understood that other types of transaction or operation may also be included within the scope of the invention.

It should also be noted that, in the embodiments that follow, the smart card cooperates in contact mode with the external terminal. However, the invention also applies to the case where the smart card communicates in contactless mode with the external terminal.

Unless otherwise indicated, elements that are common to or similar in multiple figures bear the same reference signs and have identical or similar features, and therefore said common elements are not generally described again for the sake of simplicity.

In order to facilitate understanding of the invention, an example of a payment transaction that complies with the EMV protocol is described here with reference to FIG. 1, which transaction is carried out using a smart card 4 that cooperates with an external terminal 2.

According to an embodiment of the invention, the external terminal 2 may, additionally, be configured to communicate with a bank server 3.

In this example, the smart card 4 is a payment card and the external terminal 2 is a payment terminal belonging to a vendor.

An EMV payment smart card generally contains different banking applications that allow it, for example, to operate in "credit card" mode or "debit card" mode at a point of sale or to interact with an automated banking machine.

The EMV protocol comprises a preliminary PHP phase intended to prepare the smart card 4 and the external terminal 2 for the subsequent implementation of the transaction TR itself. Different messages that comply with the EMV protocol are exchanged between the smart card 4 and the external terminal 2.

More specifically, during the preliminary PHP phase, the external terminal 2 firstly sends (E2) a RESET (RST) signal to the smart card 4. The smart card 4 responds (E4) using an ANSWER TO RESET (ATR) message.

Once said first interaction has been carried out, the external terminal 2 attempts to select the appropriate application on the smart card 4. To do this, the external terminal 2 sends (E6) a SELECT FILE command to the card 4 in order to request the applications from the payment card 1 that said payment card is capable of executing. Said SELECT FILE command typically contains the application identifier (AID) "1PAY.SYS.DDF01" as a parameter. In response, the card 1 provides (E8) a list of the different applications that it can implement via the "read record" command.

The card holder can then select the desired transaction mode via the external terminal 2, thereby prompting a SELECT APPLICATION command to be sent (E10) to the card 4 with the AID of the selected application as a parameter. It should be noted that there are different variants for selecting the appropriate application in the smart card 4.

The external terminal 2 additionally sends (E10) a GET PROCESSING OPTIONS (GPO) command to the smart card 4 in order to initiate the start of the transaction. The sending of said GPO command marks the start of the EMV transaction.

During said transaction TR, the smart card 4 sends (E14) a first series of information to the external terminal 2, for example the AIP (Application Interchange Profile), which indicates to the external terminal 2 the different operations to be carried out in order to successfully complete a transaction. The card 4 also sends (E16) an AFL (Application File Locator) message which indicates the list of the data available at the application level in the card 4 and which the external terminal 2 must read in order to be able to carry out the transaction TR. The external terminal 2 thus reads (E18-E20) the information specified on the AFL. To do this, the external terminal 2 sends (E18) one or more READ RECORD read commands to the smart card 4 and receives (E20) the requested information (referred to as RECORDS) in return.

It should be noted that the steps E14 and E16 can be carried out during sending of a single message from the smart card 4.

The information read (E18-E20) by the external terminal 2 into the card 4 comprise, for example, the expiry date of the smart card 4, the associated account number, a numerical signature for authenticating the card 4, control parameters for subsequent use for carrying out the transaction, or lists of objects referred to as CDOL lists (Card Data Object List).

According to a preferred embodiment of the invention, the information read by the card 4 into the external terminal 2 comprise usage information. When a transaction TR is carried out between the card 4 and the external terminal 2, the card 4 reads an identification datum MN of the external terminal 2, making it possible to identify said external terminal 2, or an item of time information of the transaction TR. Said item of time information may be a date or a time stamp, and may comprise the day and hour at which the transaction TR was carried out between the card 4 and the external terminal 2.

In this example, the external terminal 2 then carries out (E22) an analysis step based on the information provided (E20) by the smart card 4. If the authentication associated with the smart card 4 fails, or if an anomaly is detected, the external terminal 2 can refuse the transaction. It is assumed here that the analysis E22 has been carried out successfully.

The EMV protocol can proceed with a phase of authenticating the smart card 4 holder according to one of the methods listed and supported by said card. The external terminal 2 determines the card-holder authentication method to be applied on the basis of the information previously received in the control parameters.

In this example, the external terminal 2 sends (E24) a VERIFY request for verifying the PIN code entered by the card holder to the smart card 4. The card holder is invited to provide their PIN code, and the smart card 4 then compares (E26) the PIN code provided with the actual PIN code stored in its memory and therefrom deduces whether or not the card holder is the genuine card holder.

If the PIN code entered is correct, the smart card 4 sends (E28) an OK message of the 0x9000 type to the terminal. In the opposite case, the card 4 sends (E28) a refusal message of the Ox63Cx type to the terminal, where x is the number of PIN code attempts remaining before the card 4 blocks the transaction in progress (and future transactions). Only the case of offline PIN code verification is of interest here, i.e. when the external terminal 2 does not contact the card issuer during the PIN code verification process, although this is also possible.

Once the card holder has been authenticated, the EMV protocol proceeds with a transaction verification phase. More specifically, the external terminal 2 generates and then sends (E28) a GAC (GENERATE AC) command to the card 4. Said command contains different data previously requested by the smart card 4 in a CDOL list received in step E20 by the external terminal 2. Typically, the GAC command contains information such as the amount of the transaction in progress, the currency used, the type of transaction, etc.

In response to the GAC command, the card 4 carries out (E32) an analysis step comprising a certain number of criteria verifications. The number and nature of said verifications are not standardised by the EMV protocol and may vary as appropriate.

At the end of the analysis E32, the smart card 4 responds to the external terminal 2 by sending (E34) a cryptogram (or cryptographic certificate) comprising a message authentication code (MAC), which is typically encrypted on the basis of a cryptographic key stored in the smart card 4. The response of the card depends, in particular, on the parametrisation of the card 4 carried out by the issuing bank.

Each of the above messages exchanged according to the EMV protocol during the transaction TR, in particular between the smart card 4 and the external terminal 2, are examples of transaction messages within the meaning of the invention.

It should be reiterated here that the course of the EMV protocol described above with reference to FIG. 1 is merely a non-limiting example. Indeed, the EMV protocol offers numerous alternatives. It is the task of the integrators to make the necessary choices for adapting the execution of the protocol as required (card-holder authentication method, online or offline transaction, etc.).

According to an embodiment of the invention, communication between the external terminal 2 and a bank server 3 may also take place. When said communication takes place, messages that comply with the EMV protocol are exchanged between the smart card 4, the external terminal 2 and (in this example) the bank sever 3 during the course of the PHP phase and then the transaction TR.

In this example, the smart card 4 sends (E34) an ARQC cryptogram (Authorisation Request Cryptogram) indicating that the card 4 wishes to carry out an online transaction with the bank server 3 of the card issuer. Where appropriate, the smart card 4 may additionally send (E34) IDD (Issuer Discretionary Data) information to the external terminal 2 in addition to the cryptogram.

The external terminal 2 (E36) thus transmits the ARQC cryptogram (and where appropriate the IDD information) to the bank server 3, which is subjected to a new analysis (E38) based on the information received. Said analysis E38 typically comprises a certain number of verifications in order to ensure that the transaction is valid. In response, the external terminal 2 receives (E40) an encrypted ARPC message indicating the decision of the issuer. The external terminal 2 transmits (E42) said ARPC message to the smart card 4 in order to indicate thereto the decision made by the issuer.

If, in this example, the card 4 accepts the transaction, the card sends (E44) a cryptogram of the TC type (transaction accepted) to the external terminal 2 in response. In the opposite case, the card 4 sends (E44) a cryptogram of the AAC type indicating the refusal of the transaction.

Figure 2:
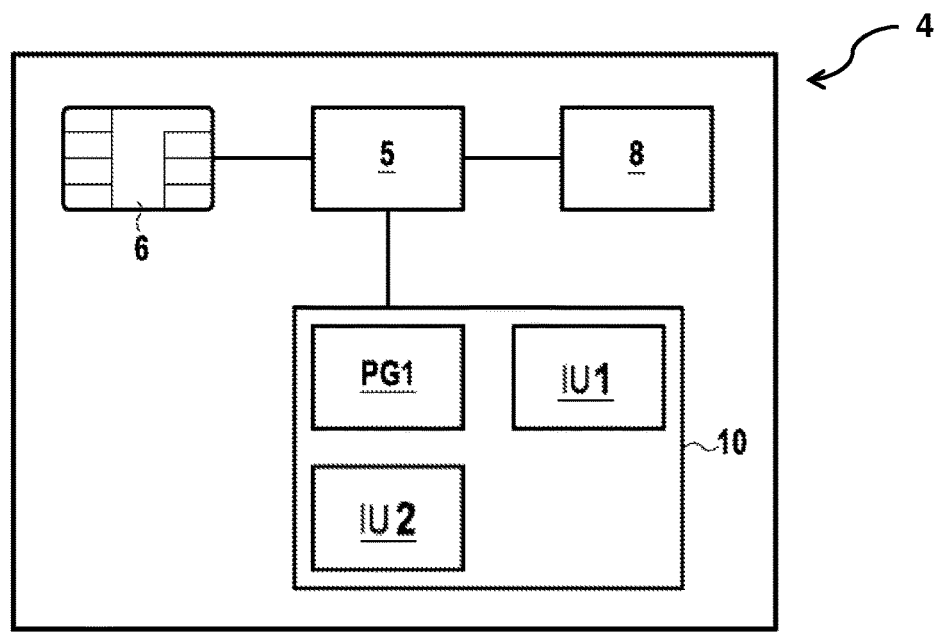
FIG. 2 schematically shows the hardware architecture of a smart card according to a particular embodiment of the invention.

FIG. 2 schematically shows the hardware architecture of a smart card 4 according to a particular embodiment of the invention. The card 4 is, in this example, an EMV card that complies with the ISO7816 standard.

More specifically, the smart card 4 in this case comprises a microprocessor 5 that is coupled to external contacts 6 (input/output ports), a rewritable volatile memory (of the RAM type) 8 and a rewritable non-volatile memory 10 (of the Flash type, for example). The card 4 may also comprise a read-only memory (of the ROM type; not shown here). Via the external contacts 6, the microprocessor 5 is able to communicate by contact with a suitable external terminal 2, for example a payment terminal. However, it shall be understood that the invention can also be applied to smart cards that communicate in contactless mode.

The external contacts 6 are an interface module that allows the smart card 4 (and more specifically the microprocessor 5) to establish communication, by means of contact in this example, with an external entity such as an external terminal 2. However, it shall be understood that other types of interface module may also be considered as an interface module that makes it possible to establish contactless communication (using a radio frequency antenna, for example) between the smart card and an external terminal.

The smart card 4 additionally comprises a secure memory 10 which acts as a recording (or information) medium according to an embodiment of the invention. Said recording medium can be read by the smart card 4, and a computer program PG1 according to an embodiment of the invention is recorded on said recording medium.

The program PG1 comprises instructions for executing the steps of a method according to an embodiment of the invention. In a non-limiting manner, said steps may comprise reading, recording or calculation steps, for example. A method step of sending data may also be stored in the secure memory 10, in accordance with an embodiment of the invention.

The memory 10 is considered here to be secure in that it uses a conventional security mechanism that is well known to a person skilled in the art and that will therefore not be described here.

According to an embodiment of the invention, the secure memory 10 additionally comprises one or more recording modules that are capable of recording usage information IU1 and IU2 of the smart card 4. Said usage information may be recorded using instructions executed by the program PG1.

According to an embodiment of the invention, the usage information IU1 and IU2 are recorded in the form of data pairs or counters, as described below. Furthermore, the secure memory 10 is configured to record data in the form of lists, for example in the form of a list having one entry or a table having two entries.

Figure 3:
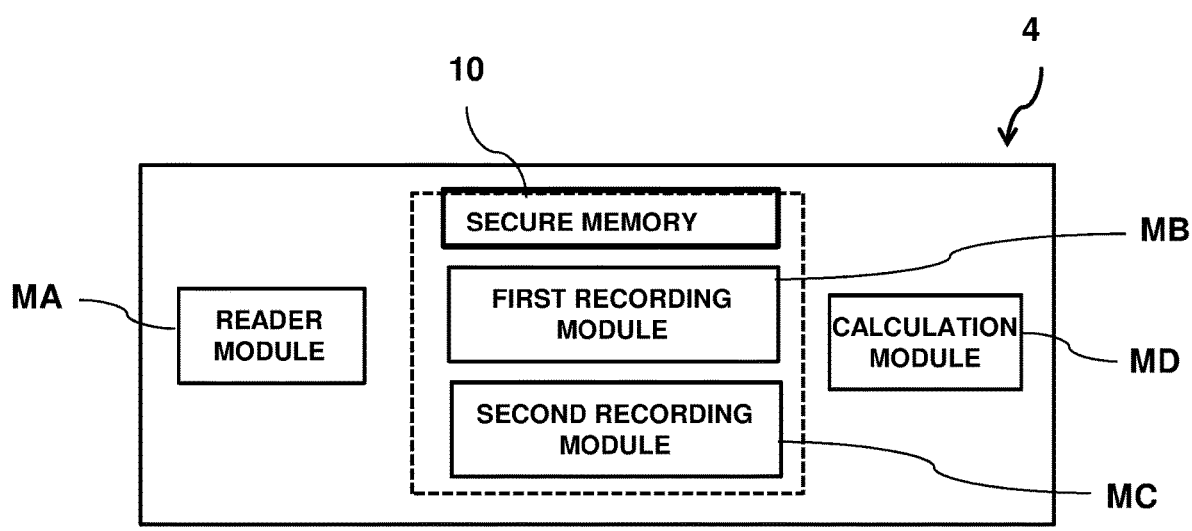
FIG. 3 schematically shows modules implemented by the smart card from FIG. 2.

FIG. 3 schematically shows modules that can be implemented by the microprocessor 5 on a smart card 4 when the program PG1 is executed.

According to an embodiment of the invention, the card 4 comprises a reader module MA which is programmed to read one or more items of usage information when a transaction is being carried out between the card 4 and an external terminal. The card 4 additionally comprises a secure memory 10 and a calculation module MD which is programmed to calculate one or more indicators on the basis of data recorded in said secure memory 10. Said recorded data comprise the usage information IU1 and IU2, for example.

According to an embodiment of the invention, the secure memory 10 of the card 4 additionally comprises a plurality of recording modules, of which a first recording module MB and a second recording module MC.

According to an embodiment of the invention, the first recording module MB and the second recording module MC may be a single recording module.

According to an embodiment of the invention, the card 4 may comprise other modules (not shown here), for example an EMV transaction detection module, an execution module for initiating an EMV transaction, or a communication module capable of sending information to a bank server 3. Said detection module may comprise a processing module that is capable of detecting an event on the basis of a command received from an external entity (such as the external terminal 2) by the interface module 6 of the smart card 4. Said command is received by the smart card 4 during a transaction with an external terminal 2, for example, said command being received from the external terminal via the external contacts 6.

Furthermore, the card 4 may comprise a control module that is capable of collaborating with said communication module and is configured to cancel a transaction TR carried out by the card 4.

It shall be understood that the modules previously described may be executed using the program PG1 comprised in the microprocessor 5.

Figure 4:
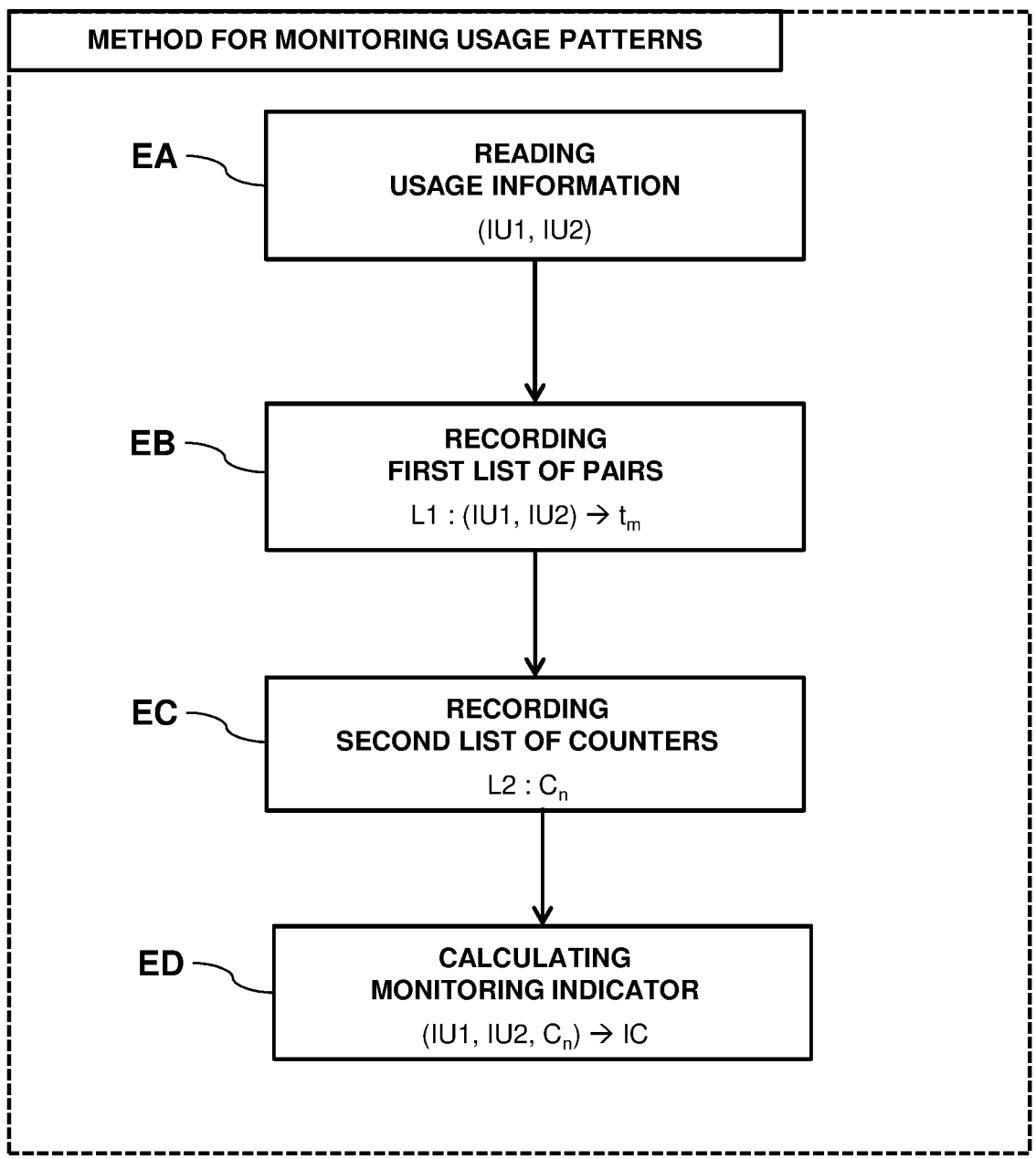
FIG. 4 is a flowchart of the main steps of a method for monitoring usage patterns of a smart card, according to an embodiment of the invention.

A particular embodiment of the invention is described here with reference to FIG. 4, which is a flowchart of the main steps of a method for monitoring usage patterns of a smart card 4 according to an embodiment of the invention.

A smart card 4 is used to carry out a transaction TR with an external device 2. During said transaction, the card 4 reads a plurality of data from the external terminal 2 during the course of a reading step EA. The data read by the card may comprise usage information comprising, for example, the amount of the transaction TR, the "type" of the transaction TR, or the date of the transaction TR. Said usage information may also comprise an identification datum MN of the external terminal 2, or a vendor identifier datum (merchant name), for example, in order to not be dependent on the very terminal used to carry out the transaction.

Said identification datum MN may comprise the "country" code of the external terminal 2, the verification results (TVR) of the external terminal 2, or the "currency" code of the external terminal 2. In particular, two items of usage information IU1 and IU2 can be read by the card 4 during a given transaction TR.

Subsequently to the reading step EA, a step EB of recording the usage information IU1 and IU2 is implemented in a secure memory 10 of the card 4. According to an embodiment of the invention, said usage information IU1 and IU2 are recorded in the form of a first list L1 of data pairs $t_m$, where m designates the number of pairs recorded.

For example, said recording step EB allows the card 4 to record an identification datum MN of the external terminal 2 in the secure memory 10 in the form of a first item of usage information IU1. According to another example, the card 4 can record an item of sequential information, such as a transaction counter, in said secure memory 10 in the form of a second item of usage information IU2. According to another example said second item of usage information IU2 may be an item of time information, for example the date of the transaction TR, which is comprised in a predetermined time range ($I_n$). Furthermore, the first item of usage information IU1 and/or the second item of usage information IU2 may comprise a counter $C_n$ that is recorded in the secure memory 10 of the card 4 during the course of the recording step EB.

In the example of an EMV card that complies with the ISO7816 standard, a counter $C_n$ may therefore be an ATC transaction counter which adds up the number of transactions carried out by said card, successfully or unsuccessfully, since its activation. A counter $C_n$ of the ATC type is thus incremented after each time a GPO command is sent by the external terminal 2 when a transaction TR is carried out.

Subsequently to the first reading step EB, a second recording step EC is implemented. Said second recording step EC records, in a secure memory 10 of the card 4, a second list L2 comprising one or more counters $C_n$. In a non-limiting manner, the first reading step EB and the second recording step EC are implemented separately.

Subsequently to the second recording step EC, a calculation step ED is implemented.

Figure 5:
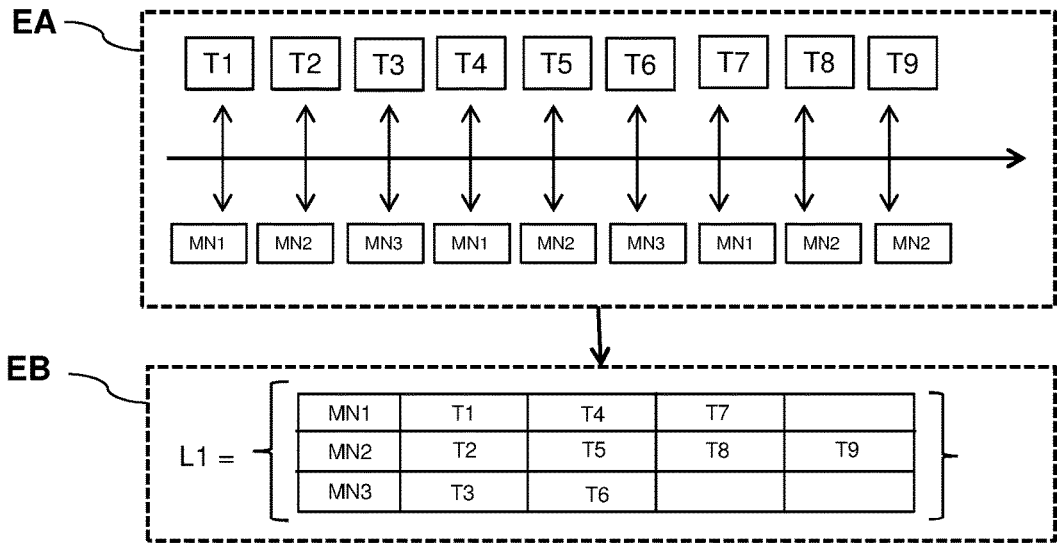
FIG. 5 shows an example of a first recording step according to an embodiment of the invention.

FIG. 5 shows an embodiment of a reading step EA and a first step EB of recording, in a secure memory 10 of the smart card 4, a first list L1 of data according to a first embodiment of the invention.

In the example shown, nine transactions {T1,T2,T3,T4, T5,T6,T7,T8,T9} are carried out on different successive dates between the card 4 and three external terminals MN1, MN2 and MN3. The identification data of said three external terminals are not previously recorded. In general, this is the case when the card 4 is used for the first time to carry out a transaction with a new vendor. Furthermore, said three external terminals may belong to the same vendor or to different vendors, and are designated by different identification data.

In this example, a card 4 is used to carry out, in succession: a transaction with MN1 at a date T1, a transaction with MN2 at a date T2, a transaction with MN3 at a date T3, a transaction with MN1 at a date T4, a transaction with MN2 at a date T5, a transaction with MN3 at a date T6, a transaction with MN1 at a date T7, a transaction with MN2 at a date T8, and then a transaction with MN2 at a date T9.

During the course of reading step EA, the smart card 4 reads said information and, during the course of the recording step EB, records same in the form of a first list L1 in the secure memory 10.

Following the reading step EA, a first list L1 comprising the nine data pairs $\{t_1,t_2,t_3,t_4,t_5,t_6,t_7,t_8,t_9\}$ is recorded during the course of the first recording step EB. As shown in FIG. 5, said nine pairs are recorded in the first list L1 in the form of a table having two entries, one of said two entries corresponding to the identification data of the external terminals, and the other of said two entries corresponding to the dates on which the card 4 was used to carry out a transaction with each of said external terminals.

The corresponding data pairs $t_m$ are thus recorded in the first list L1 in an ergonomic manner in the form of three data vectors $\{(MN1, T1, T4, T7), (MN2, T2, T5, T8, T9), (MN3, T3, T6)\}$, each data vector comprising an identification datum of one of the external terminals and all the successive dates of the transactions carried out between the card 4 and said external terminals. The recorded data vectors thus have a record of all the dates on which a transaction was carried out.

Alternatively, the nine data pairs $\{t_1,t_2,t_3,t_4,t_5,t_6,t_7,t_8,t_9\}$ may be recorded in the first list L1 in the form of a sequence $\{(MN1,T1), (MN2, T2), (MN3, T3), (MN1, T4), (MN2, T5), (MN3, T6), (MN1, T7), (MN2, T8), (MN2, T9)\}$, each pair containing the identification datum of the external terminal and the date of the transactions carried out.

Recording the first list L1 in the form of a table having two entries during the course of the first recording step EB makes it possible to limit the use of the secure memory 10 by recording, only once, the identification datum of an external terminal with which a transaction is carried out.

Furthermore, the first recording step EB may record only the second item of usage information IU2 in the first list L1 of data pairs $t_m$ if the first item of usage information IU1 is comprised in one of said pairs $t_m$ prior to the reading step EA. When the first item of usage information IU1 is an identification datum MN of an external terminal 2 with which the card 4 carries out a transaction TR, this makes it possible to reduce the use of the secure memory 10 when a plurality of transactions are carried out with this same terminal.

A second recording step EC and a calculation step ED (not shown) are implemented following the first recording step EB.

In particular, the second recording step EC is implemented in a secure memory 10 of the card 4. Said second recording step EC is intended to record a second list L2 of counters $C_n$ in the memory 10.

Figure 6:
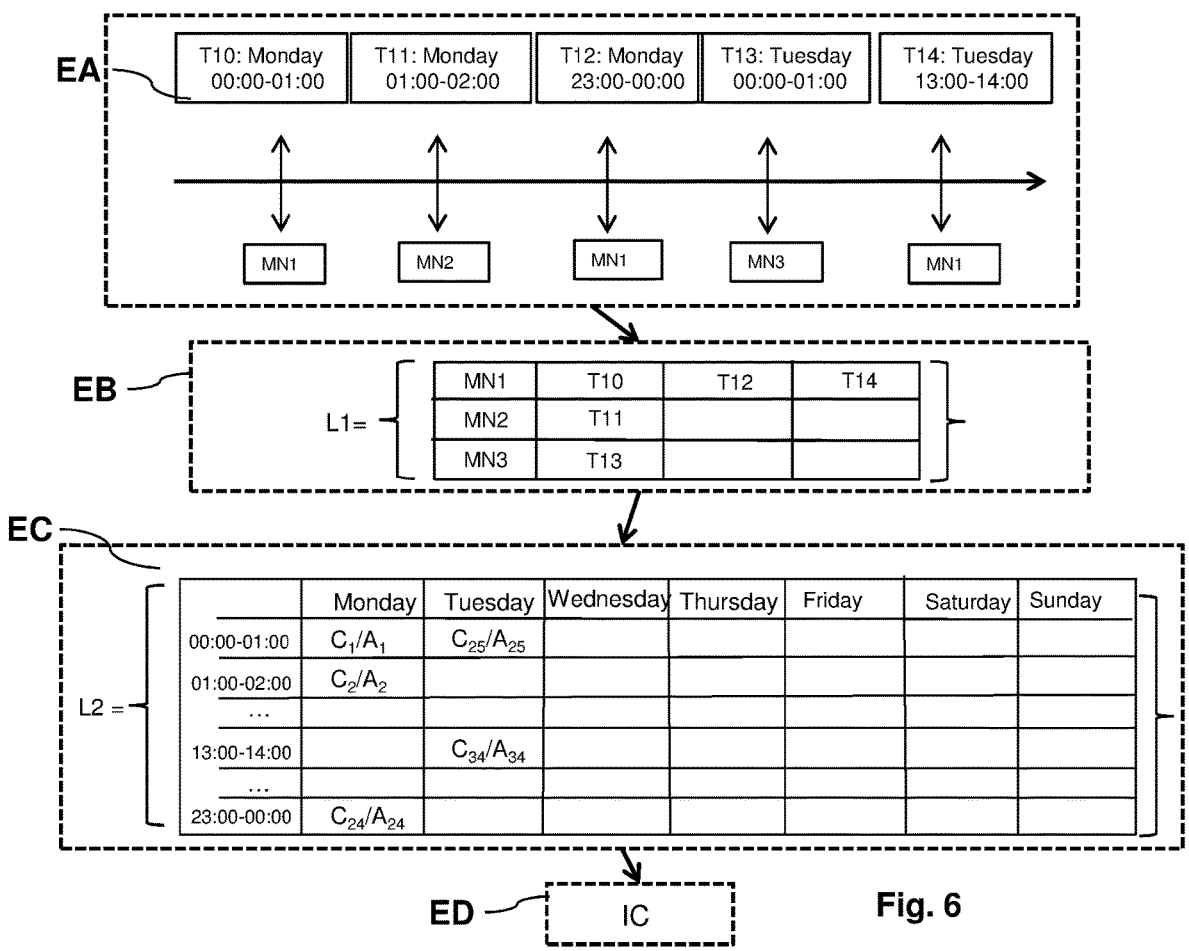
FIG. 6 shows an example of implementing steps of a method for monitoring usage patterns according to an embodiment of the invention.

FIG. 6 shows an embodiment of the invention in which a second list L2 of counters $C_n$ is recorded during a second recording step EC. Said second recording step EC is subsequent to the recording of the first list L1 of data pairs $t_m$ during the first recording step EB. The step EC may be carried out, for example, when the second item of usage information IU2 is an item of time information comprised in a predetermined time range $I_n$.

According to an embodiment of the invention, the predetermined time range $I_n$ is an hour range of a day of the week recorded in a secure memory 10 of the card 4.

It shall be understood that a plurality of time ranges $I_n$ is predetermined, and that said plurality of time ranges may be recorded in a secure memory 10 of the card 4 prior to activation of said card. Said plurality of time ranges $I_n$ may comprise a list of years, a list of months, a list of days, a list of hours or any list of time intervals.

In particular, a plurality of predetermined time ranges $I_n$ may be previously recorded in a secure memory 10 of the card 4 in the form of a table having two entries. In this example, one of said two entries corresponds to a day of the week selected from: Monday, Tuesday, Wednesday, Thursday, Friday, Saturday and Sunday. The other of said two entries corresponds to one of the 24 hour ranges chosen from 00:00-01:00, 01:00-02:00, . . . , 23:00-00:00. The plurality of predetermined time ranges $I_n$ may also be recorded in the form of a single list comprising 24×7 hour ranges $I_1$, $I_2, \ldots I_{168}$.

In the example shown in FIG. 6, five transactions are carried out between the card 4 and three external terminals on different successive dates. Said three external terminals are identified by identification data MN1, MN2, and MN3. The three first transactions are carried out on three first dates, T10, T11 and T12 corresponding to a Monday between 00:00 and 01:00, a Monday between 01:00 and 02:00, and a Monday between 23:00 and 00:00. The two last transactions are carried out on two dates T13 and T14 corresponding to a Tuesday between 00:00 and 01:00, and a Tuesday between 13:00 and 14:00.

In this example, and subsequently to the reading step EA, the first recording step EB records a first list L1 of data pairs $t_m$ corresponding to $\{(MN1,T10,T12,T14), (MN2,T11), (MN3,T13)\}$ in the form of a table having two entries.

Subsequently to the first recording step EB, a second recording step EC records a second list L2 of counters $C_n$ in a secure memory 10 of the card 4.

In a non-limiting manner, a counter $C_n$ may be any type of counter capable of counting one or more items of information associated with the transactions carried out by the card 4, for example the sum of the amounts of said transactions.

In the example shown, the time ranges $I_n$ comprise one of the seven days of the week and one of the 24 hour ranges of the day, each of the five transactions generates recording, in the secure memory 10 of the card 4, of a counter $C_n$ associated with the time range $I_n$ in which said transaction was carried out. Each counter $C_n$ thus records the cumulative number of transactions carried out within the corresponding time range $I_n$.

According to an embodiment of the invention, one counter $C_n$ may be selected from different types of counters, for example an ATC transaction counter $A_n$ or a transaction accumulator for a time range $I_n$, which adds up the number of transactions carried out by the card 4 within the time range $I_n$.

During the second recording step EC, the transaction carried out on the date T10 leads to the recording of a counter $C_1$, the transaction on the date T11 leads to the recording of a counter $C_2$, the transaction on the date T12 leads to the recording of a counter $C_{24}$, the transaction on the date T13 leads to the recording of a counter $C_{25}$, and the transaction on the date T14 leads to the recording of a counter $C_{34}$. For these five transactions, the second list L2 of counters $C_n$ may therefore be a table having two entries comprising the counters $C_1$, $C_2$, $C_{24}$, $C_{25}$, $C_{34}$.

Following the second recording step EC, a calculation step ED is implemented in order to calculate at least one indicator IC for monitoring the usage patterns of the electronic device 4 at least on the basis of the data recorded in the secure memory 10 of the card 4.

According to an embodiment of the invention, the recorded data used in order calculate the monitoring indicator IC may comprise a first item of usage information IU1 and/or a second item of usage information IU2 comprised in the list L1, and/or one or more counters $C_n$ comprised in the second list L2. A value of the monitoring indicator IC may be calculated according to different rules.

In a first example, the monitoring indicator IC may be the first item of usage information IU1 and/or the second item of usage information IU2 comprised, for example, in one of the pairs $t_m$ recorded in the first list L1. For example, this makes it possible to monitor the usage patterns of a smart card 4 used to carry out transactions in relation to a recurring transaction recipient.

The monitoring indicator IC may thus be used to monitor the usage patterns of the smart card 4 by analysing, for example, an identification datum MN of the external terminal 2, an item of sequential information such as a counter of transactions carried out by said card 4, or an item of time information associated with the use of said card 4, such as a date of a transaction TR carried out by said card 4.

In another example, the monitoring indicator IC may be a current value of a counter $C_n$ recorded in the second list L2. When the counter $C_n$ corresponds to a predetermined time range $I_n$, the monitoring indicator IC makes it possible to monitor the usage patterns of the smart card 4 over said predetermined time range $I_n$. Thus, in the example shown in FIG. 6, the value of a monitoring indicator IC equal to $C_{34}$ makes it possible to deduce the number of transactions carried out by the card 4 on Tuesdays between 13:00 and 14:00.

In another example, the monitoring indicator IC may be a difference $D_n$ between a current value of a counter $A_{total}$ of the total number of ATC transactions and the current value of a counter $A_n$ of ATC transactions of the card 4 calculated during the last transaction carried out within the time range $I_n$. Calculating a value of a monitoring indicator IC, the value of which is equal to a difference $D_n$ between a counter $A_n$ from the second list L2 and a current value $A_{total}$ of the total number of ATC transactions of an application transaction counter ATC of the card 4, makes it possible to monitor the emergence of new usage patterns of said card 4 over the predetermined time range $I_n$ corresponding to said counter $C_n$.

Thus, in the example shown in FIG. 6, a value of a monitoring indicator IC equal to the difference $D_{34}=A_{total}-A_{34}$ makes it possible to deduce how many transactions have been carried out by the card 4 since the last payment of the time slot on Tuesdays between 13:00 and 14:00 and the most recent transaction carried out by said card 4. For example, if the current value $A_{total}$ of the total number of ATC transactions of an application transaction counter ATC is equal to twelve and if the value of the counter $A_{34}$ is equal to six, it follows that six transactions were carried out by the card 4 since the most recent Tuesday, between 13:00 and 14:00.

In another example, the monitoring indicator IC may be an estimation of at least one ratio $R_n$ of a current value of an application transaction counter ATC of the card 4 to a counter $C_n$.

Calculating a value of a monitoring indicator IC, the value of which is equal to an estimation of a ratio $R_n$ of a counter $C_n$ from the second list L2 to a current value of an application transaction counter ATC of the card 4, makes it possible to monitor in which predetermined time ranges $I_n$ the card 4 is frequently used in order to carry out a transaction.

Thus, in the example shown in FIG. 6, a value of a monitoring indicator IC equal to the ratio $R_{34}=C_{34}/A_{34}$ makes it possible to deduce an estimation of the usage frequency of the card 4 for carrying out transactions on Tuesdays between 13:00 and 14:00. If the value of the counter $A_{34}$ is equal to twelve and if the value of the counter $C_{34}$ is equal to six, it follows that the value of the corresponding monitoring indicator will be equal to 0.5, which indicates a greater usage frequency of the card 4 on Tuesdays between 13:00 and 14:00 than over a time interval $I_n$ of which the value of the counter $C_n$ is less than six.

It shall be understood that any mathematical combination of a first item of usage information IU1, of a second item of usage information IU2 and/or of a counter $C_n$ recorded in a secure memory 10 of the card 4 may advantageously be used to deduce information on the usage patterns of said card 4.

According to an embodiment of the invention, the calculation step ED may be implemented only when particular predetermined conditions are met. Said predetermined conditions may be recorded in the secure memory 10 of the card 4. For example, it is feasible to put in place a mechanism for monitoring the usage patterns of the card 4 when the number of pairs $t_m$ recorded in the first list L1 and comprising an identical value of the first item of usage information IU1 is greater than a predetermined number selected from: 3, 4, 5 or 6. When said first item of usage information IU1 is an identification datum MN of an external terminal 2, it is then possible to monitor the usage patterns of the card 4 only when a sufficient number of transactions has been carried out with said external terminal 2.

Figure 7:
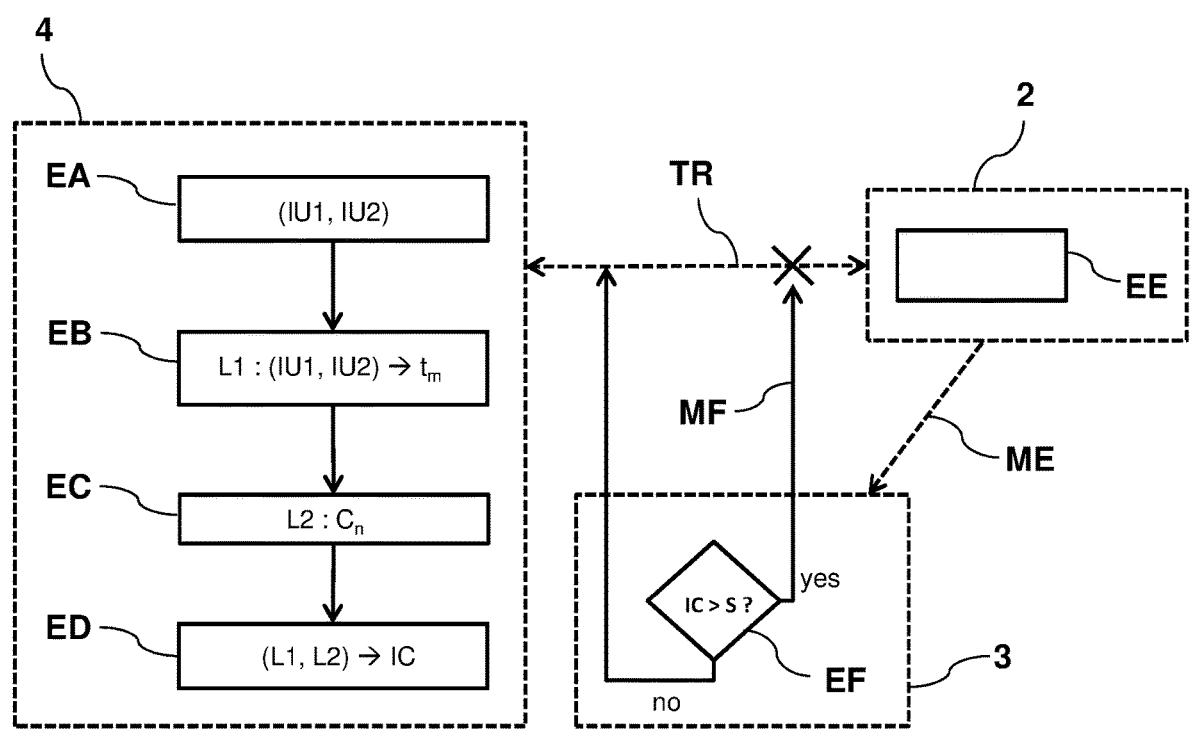
FIG. 7 is a flowchart of steps of a method for monitoring usage patterns of a smart card, according to an embodiment of the invention.

FIG. 7 is a flowchart of steps of a method for monitoring usage patterns of a smart card, according to an embodiment of the invention.

According to an embodiment of the invention, and subsequently to the calculation step ED, additional steps may be implemented when the transaction TR is carried out in online mode, i.e. when said transaction TR is carried out between a smart card 4 and an external terminal 2 that is connected to a bank server 3.

Among these additional steps, a step EE of sending the monitoring indicator IC to a bank server 3 may be carried out. Said sending step EE may be implemented by the card 4 and/or by the external terminal 2 using sending means, for example a monitoring message ME. Said sending means are secured and may comprise a wire connection, for example of the Ethernet or CPL type, a wireless connection, for example of the WiFi or Bluetooth type, or any other type of connection that may vary depending on the preferred material for implementing the invention.

According to an embodiment of the invention, the bank server 3 receives the monitoring indicator IC and carries out an analysis of the value thereof in order to deduce information on the usage patterns of the card 4. Said analysis in online mode makes it possible to increase the performance and speed of the monitoring of the usage patterns of the card 4 using analysis means that are external to said card 4 and external terminal 2.

Furthermore, a step EF of cancelling the transaction TR may be implemented by the bank server 3 in order to cancel said transaction when one or more conditions are met. According to an embodiment of the invention, a cancellation message MF is issued by the bank server 3 when the value of the indicator IC is greater than a predetermined threshold S.

A person skilled in the art will understand that the embodiments and variants described above are merely non-limiting examples for implementing the invention. In particular, a person skilled in the art will be able to envisage any combination of the variants and embodiments described above in order to address a particular need.

The invention claimed is:

1. A method for detecting possible fraud in a transaction carried out between an electronic device and an external transaction terminal by monitoring usage patterns of said electronic device, wherein the electronic device comprises a smart card having a secure memory and a control module, the method comprising:
providing, on the secure memory of the electronic device, a list of counters, wherein each counter of the list of counters is a transaction accumulator associated with a different time segment of a repeating time interval, wherein the transaction accumulator for each time segment accumulates the number of transactions carried out by the smart card during that time segment;
for each transaction of a plurality of transactions:
reading, by the electronic device, an item of usage information while each transaction is being carried out, wherein the item of usage information includes a time stamp of each transaction located within a time segment of the repeating time interval;
incrementing, by the electronic device and recording on the secure memory, an application transaction counter ATC of the electronic device in response to each transaction, wherein the application transaction counter ATC accumulates a total number of transactions carried out by the smart card since its activation; and
incrementing, by the electronic device and recording on the secure memory, a counter of the list of counters associated with the time segment of the repeating time interval within which the time stamp is located;
calculating, by the electronic device, in each time segment, at least one monitoring indicator value for monitoring usage patterns of the electronic device, wherein the at least one monitoring indicator value is selected from:
a difference between a current value of at least one counter of the list of counters and a current value of the application transaction counter ATC of the electronic device; and
at least one ratio of a current value of the application transaction counter ATC of the electronic device to a current value of at least one counter of the list of counters;
detecting, by the electronic device, whether, for a given transaction in a given time segment, the given transaction associated with the usage of the electronic device is fraudulent by comparing the selected monitoring indicator value to previously determined monitoring indicator values for the given time segment to detect whether the usage patterns of the electronic device have changed; and
in response to detecting the given transaction as being fraudulent, cancelling the given transaction by the control module of the electronic device in an offline mode or by a bank server in an online mode.

2. The method according to claim 1, wherein reading the item of usage information while each transaction is being carried out includes reading a first item of usage information and a second item of usage information, and wherein the method further comprises:
recording only the second item of usage information on the secure memory if the first item of usage information has previously been recorded on the secure memory prior to the reading step a).

3. The method according to claim 2, wherein the calculating step is implemented when a number of transactions having an identical value of the first item of usage information is greater than a predetermined number selected from: 3, 4, 5, 6.

4. The method according to claim 2, wherein said second item of usage information is an item of sequential information.

5. The method according to claim 1, wherein the time segment is an hour range of a day of the week.

6. The method according to claim 1, wherein cancelling the given transaction includes:
sending the selected monitoring indicator value to the bank server in a monitoring message; and
cancelling the transaction by means of a cancellation message issued by the bank server when the value of the indicator is greater than a predetermined threshold.

7. The method according to claim 1, wherein the transaction complies with the EMV protocol.

8. A non-transitory recording medium which can be read by a microprocessor on which a computer program is recorded which comprises instructions for executing the steps of a method according to claim 1.

9. A smart card electronic device comprising:
a reader module which is programmed to read an item of usage information while a transaction is being carried out between said electronic device and an external transaction terminal, wherein said item of usage information includes a time stamp of each transaction located within a time segment of a repeating time interval; and
a secure memory comprising:
a list of counters, wherein each counter of the list of counters is a transaction accumulator associated with a different time segment of the repeating time interval, wherein the transaction accumulator for each time segment accumulates the number of transactions carried out by the smart card during that time segment; and
a first recording module for incrementing and recording on the secure memory an application transaction counter ATC of the electronic device in response to each transaction, wherein the application transaction counter ATC accumulates a total number of transactions carried out by the smart card since its activation;
a second recording module for incrementing and recording on the secure memory a counter of the list of counters associated with the time segment of the repeating time interval within which the time stamp for each transaction is located; and
a calculation module which is programmed to calculate, in each time segment, at least one monitoring indicator value for monitoring usage patterns of the electronic device,
wherein said at least one monitoring indicator value is selected from:
a difference between a current value of at least one counter of the list of counters and a current value of the application transaction counter ATC of said electronic device; and at least one ratio of a current value of the application transaction counter ATC of said electronic device to a current value of at least one counter of the list of counters;

a detection module which is programmed to detect whether, for a given transaction in a given time segment, the given transaction associated with the usage of the electronic device is fraudulent by comparing the selected monitoring indicator value to previously determined monitoring indicator values for the given time segment to detect whether the usage patterns of the electronic device have changed; and a control module which is programmed to cancel the given transaction in an offline mode, in case the transaction is detected as being fraudulent by said detection module.

* * * * *